United States Patent
Greenhalgh et al.

(10) Patent No.: US 10,850,317 B2
(45) Date of Patent: Dec. 1, 2020

(54) SUPERPLASTIC FORMING AND DIFFUSION BONDING PROCESS

(71) Applicant: BAE Systems plc, London (GB)

(72) Inventors: Robert William Greenhalgh, Balderstone (GB); Howard James Price, Blackburn (GB)

(73) Assignee: BAE Systems plc, London (GB)

( * ) Notice: Subject to any disclaimer, the term of this patent is extended or adjusted under 35 U.S.C. 154(b) by 0 days.

(21) Appl. No.: 16/634,927

(22) PCT Filed: Aug. 10, 2018

(86) PCT No.: PCT/GB2018/052276
§ 371 (c)(1),
(2) Date: Jan. 29, 2020

(87) PCT Pub. No.: WO2019/038516
PCT Pub. Date: Feb. 28, 2019

(65) Prior Publication Data
US 2020/0238359 A1    Jul. 30, 2020

(30) Foreign Application Priority Data

Aug. 22, 2017  (EP) ..................................... 17187301
Aug. 22, 2017  (GB) ................................... 1713454.5

(51) Int. Cl.
*B23K 20/00*    (2006.01)
*B21D 26/055*    (2011.01)
(Continued)

(52) U.S. Cl.
CPC .......... *B21D 26/055* (2013.01); *B21D 53/78* (2013.01); *B23K 20/04* (2013.01); *B21D 26/059* (2013.01);
(Continued)

(58) Field of Classification Search
CPC .... B21D 26/055; B21D 53/78; B21D 26/059; B21D 47/00; B21D 53/92; B23K 2103/10;
(Continued)

(56) References Cited

U.S. PATENT DOCUMENTS 3,934,441 A    1/1976  Hamilton et al.
4,042,162 A *  8/1977  Meginnis ............... B23K 20/00
                                                    228/106

(Continued)

FOREIGN PATENT DOCUMENTS

EP    560528 A1 *   3/1992
EP    0549172 A1    6/1993
(Continued)

OTHER PUBLICATIONS

International Preliminary Report on Patentability of International Application No. PCT/GB2018/052276, dated Feb. 25, 2020, 9 pages.
(Continued)

*Primary Examiner* — Kiley S Stoner
(74) *Attorney, Agent, or Firm* — Maine Cernota & Rardin (57) ABSTRACT

A process and apparatus for forming a structure comprising: a) forming a pack from a skin sheet and a core sheet, wherein venting grooves are formed in a surface of a sheet that is adjacent to the other sheet; b) placing the pack in a mould and heating the pack; c) injecting a first gas between the core and skin sheets to urge the skin sheet against the mould; d) injecting a second gas on the side of the core sheet remote from the skin sheet to urge the core sheet against the skin sheet; e) maintaining gas pressure of the second gas thereby diffusion bonding the sheets; and f) withdrawing some or all of the first gas from the cavity.

13 Claims, 8 Drawing Sheets

(51) Int. Cl.
*B21D 53/78* (2006.01)
*B23K 20/04* (2006.01)
*B23K 103/10* (2006.01)
*B23K 103/14* (2006.01)
*B21D 26/059* (2011.01)
*B21D 47/00* (2006.01)

(52) U.S. Cl.
CPC .......... *B21D 47/00* (2013.01); *B23K 2103/10* (2018.08); *B23K 2103/14* (2018.08); *F05D 2220/323* (2013.01); *F05D 2230/236* (2013.01)

(58) Field of Classification Search
CPC ...... B23K 2103/14; B23K 2101/04–14; B23K 20/00; B23K 20/001; B23K 20/02–04; F05D 2220/323; F05D 2230/236
USPC ........ 228/193–195, 235.1–235.3, 141.1–265
See application file for complete search history.

(56) References Cited

U.S. PATENT DOCUMENTS

| | | | | |
|---|---|---|---|---|
| 4,087,037 | A * | 5/1978 | Schier | B21D 26/055 219/85.17 |
| 4,117,970 | A * | 10/1978 | Hamilton | B21D 26/055 219/85.17 |
| 4,304,821 | A * | 12/1981 | Hayase | B21D 26/055 156/79 |
| 4,426,032 | A | 1/1984 | Leodolter | |
| 4,811,890 | A * | 3/1989 | Dowling | B21D 26/055 228/157 |
| 4,916,928 | A * | 4/1990 | Ecklund | B21D 26/055 228/157 |
| 5,115,963 | A * | 5/1992 | Yasui | B21D 26/055 228/157 |
| 5,118,571 | A | 6/1992 | Petersen | |
| 5,141,146 | A * | 8/1992 | Yasui | B23K 20/02 228/157 |
| 5,143,276 | A * | 9/1992 | Mansbridge | B21D 26/055 228/157 |
| 5,204,161 | A * | 4/1993 | Pettit | B29C 49/0047 428/174 |
| 5,240,376 | A * | 8/1993 | Velicki | F04D 29/023 416/229 A |
| 5,330,093 | A | 7/1994 | Bottomley | |
| 5,366,787 | A * | 11/1994 | Yasui | B29C 49/0047 228/157 |
| 5,385,204 | A * | 1/1995 | Boardman | B23K 20/18 165/170 |
| 5,603,449 | A * | 2/1997 | Mansbridge | B21D 26/055 228/157 |
| 5,611,944 | A * | 3/1997 | Gilkinson | B21D 26/055 219/117.1 |
| 5,687,900 | A * | 11/1997 | Zaccone | B21D 26/055 228/173.6 |
| 5,692,881 | A | 12/1997 | Leibfried | |
| 5,881,459 | A * | 3/1999 | Yasui | B21D 26/055 228/190 |
| 5,890,285 | A * | 4/1999 | Pruitt | B21D 26/055 29/889.72 |
| 5,941,446 | A * | 8/1999 | Yasui | B23K 20/02 228/157 |
| 5,994,666 | A * | 11/1999 | Buldhaupt | B21D 26/055 219/121.64 |
| 6,138,898 | A | 10/2000 | Will | |
| 6,419,146 | B1 | 7/2002 | Buldhaupt | |
| 7,049,548 | B1 | 5/2006 | Sjogren | |
| 7,318,333 | B2 | 1/2008 | Allor | |
| 8,707,747 | B1 | 4/2014 | Norris | |
| 10,562,090 | B2 | 2/2020 | Nazaret | |
| 10,682,902 | B2 | 6/2020 | Otsuka | |
| 2003/0154586 | A1 * | 8/2003 | Nicholson | B23P 15/04 29/421.1 |
| 2005/0121498 | A1 | 6/2005 | Franchet | |
| 2005/0133567 | A1 | 6/2005 | Runyan | |
| 2006/0086774 | A1 * | 4/2006 | Sanders | B21D 26/055 228/112.1 |
| 2007/0102494 | A1 | 5/2007 | Connelly | |
| 2008/0216316 | A1 * | 9/2008 | Knott | B21D 26/055 29/889.72 |
| 2010/0239427 | A1 * | 9/2010 | Strother | B21D 26/055 416/229 A |
| 2017/0050229 | A1 * | 2/2017 | Matsen | B21D 26/031 |

FOREIGN PATENT DOCUMENTS

| | | | | |
|---|---|---|---|---|
| EP | 0568188 A1 | 11/1993 | | |
| EP | 1455965 B1 | 1/2007 | | |
| EP | 2368651 A1 | 9/2011 | | |
| JP | 05185169 A | 7/1993 | | |
| JP | 2002018532 A | * | 1/2002 | .......... B23K 20/023 |
| JP | 2002018532 A | 1/2002 | | |
| WO | 03055618 A1 | 7/2003 | | |

OTHER PUBLICATIONS

Notice of Allowance for Patent Appl. No. 16634920, dated Jul. 2, 2020, 18 Pages.
European Search Report and Written Opinion for Appl No. EP17187301.1 dated Mar. 1, 2018, 7 pages.
PCT International Search Report & Written Opinion for Appl No. PCT/GB2018/052276 dated Nov. 15, 2018, 10 pages.
Great Britain Search Report for Appl No. GB1713454.5 dated Jan. 10, 2018, 3 pages.
European Search Report and Written Opinion for Appl No. EP17187302.9 dated Mar. 2, 2018, 7 pages.
PCT International Search Report & Written Opinion for Appl No. PCT/GB2018/052277 dated Nov. 20, 2018, 12 pages.
Great Britain Search Report for Appl No. GB1713455.2 dated Jan. 9, 2018, 3 pages.

* cited by examiner

SUPERPLASTIC FORMING AND DIFFUSION BONDING PROCESS

RELATED APPLICATIONS

This application is a national phase application filed under 35 USC § 371 of PCT Application No. PCT/GB2018/052276 with an International filing date of Aug. 10, 2018, which claims priority of GB Patent Application 1713454.5 filed Aug. 22, 2017 and EP Patent Application 17187301.1 filed Aug. 22, 2017. Each of these applications is herein incorporated by reference in its entirety for all purposes.

FIELD OF THE INVENTION

The present invention relates to the forming of a structure using diffusion bonding (DB) and superplastic forming (SPF) techniques. The present invention has particular application in the aerospace industry, for example, in the production of panels and structures for aircraft.

BACKGROUND

Combined superplastic forming/diffusion bonding (SPF/DB) is an established technique for making structural components, particularly lightweight components requiring complex internal structures, from materials that exhibit superplastic properties at elevated temperatures. These materials are primarily titanium alloys, especially (but not exclusively) titanium/aluminium/vanadium alloys.

Typical examples of known superplastic forming/diffusion bonding processes are described in U.S. Pat. Nos. 5,143,276, 4,534,503, GB-2,030,480, GB-2,129,340, U.S. Pat. Nos. 4,607,783, 4,351,470, 4,304,821, 5,994,666 and EP-0,502,620.

SUMMARY OF THE INVENTION

In a first aspect, the present invention provides a process of forming a structure by diffusion bonding and superplastic forming at least one skin sheet and at least one core sheet. The process comprises: a) forming a pack from the at least one skin sheet and the at least one core sheet, wherein the pack comprises a first surface of the core sheet positioned adjacent to a second surface of the skin sheet, and wherein one or more venting grooves are formed in at least one surface selected from the group of surfaces consisting of the first surface of the core sheet and the second surface of the skin sheet; b) placing the pack in a mould and heating the pack to a temperature at which the sheets are capable of superplastic deformation; c) injecting a first gas between the first surface of the core sheet and the second surface of the skin sheet to urge the skin sheet against an internal face of the mould thereby forming a cavity between the first surface of core sheet and the second surface of the skin sheet; d) injecting a second gas on the side of the core sheet remote from the skin sheet to urge the core sheet against the skin sheet; e) maintaining gas pressure of the second gas on the side of the core sheet remote from the skin sheet, thereby forming a diffusion bond between the skin sheet and the core sheet; and f) withdrawing some or all of the first gas from the cavity between the first surface of core sheet and the second surface of the skin sheet during at least part of step d). The venting grooves tend to facilitate gas withdrawal during step f), thereby improving diffusion bonding between the core and skin sheets.

The one or more venting grooves may be formed in the second surface of the skin sheet and not in the first surface of the core sheet. The one or more venting grooves may define one or more meandering paths across the surface or surfaces in which the one or more venting grooves are formed. The one or more venting grooves may be formed by machining the surface or surfaces in which the one or more venting grooves are formed. The one or more venting grooves may define a plurality of interconnected loops. The loops may be circles or ellipses. The process may further comprise locating a mechanical fastener through the formed structure at a position that is within a loop defined by the venting grooves. The one or more venting grooves may be located in at least a flange portion of the structure.

The process may further comprise injecting a third gas on the side of the skin sheet remote from the core sheet, between the skin sheet and the mould, thereby to force together the skin sheet and the core sheet. The first gas may be the same type of gas as the second gas. The third gas may be the same type of gas as the first gas and/or the second gas. The first, second, and/or third gas may be noble gases.

At least two core sheets may be used, those at least two core sheets having been joined together in selected areas. The second gas injected in step d) may be injected between the at least two core sheets.

Two skin sheets may be used. The pack in step a) may be formed by sandwiching one or more core sheets between the skin sheets. The first gas may be injected in step c) between each skin sheet and its adjacent core sheet. In step f), the first gas may be withdrawn from the cavity between each skin sheet and its adjacent core sheet.

In a further aspect, the present invention provides a pack for undergoing diffusion bonding and superplastic forming. The pack comprises at least one core sheet and at least one skin sheet. A first surface of the core sheet is positioned adjacent to a second surface of the skin sheet. One or more venting grooves are formed in at least one surface selected from the group of surfaces consisting of the first surface of the core sheet and the second surface of the skin sheet.

In a further aspect, the present invention provides a structure comprising: at least one core sheet that has been superplastically formed; and at least one skin sheet that has been superplastically formed. At least part of a first surface of the core sheet is diffusion bonded to a second surface of the skin sheet. One or more venting grooves are formed in at least one surface selected from the group of surfaces consisting of the first surface of the core sheet and the second surface of the skin sheet.

In a further aspect, the present invention provides a structure formed according to the process described herein.

The structure of the present invention may be an aircraft panel.

DETAILED DESCRIPTION

Figure 1:
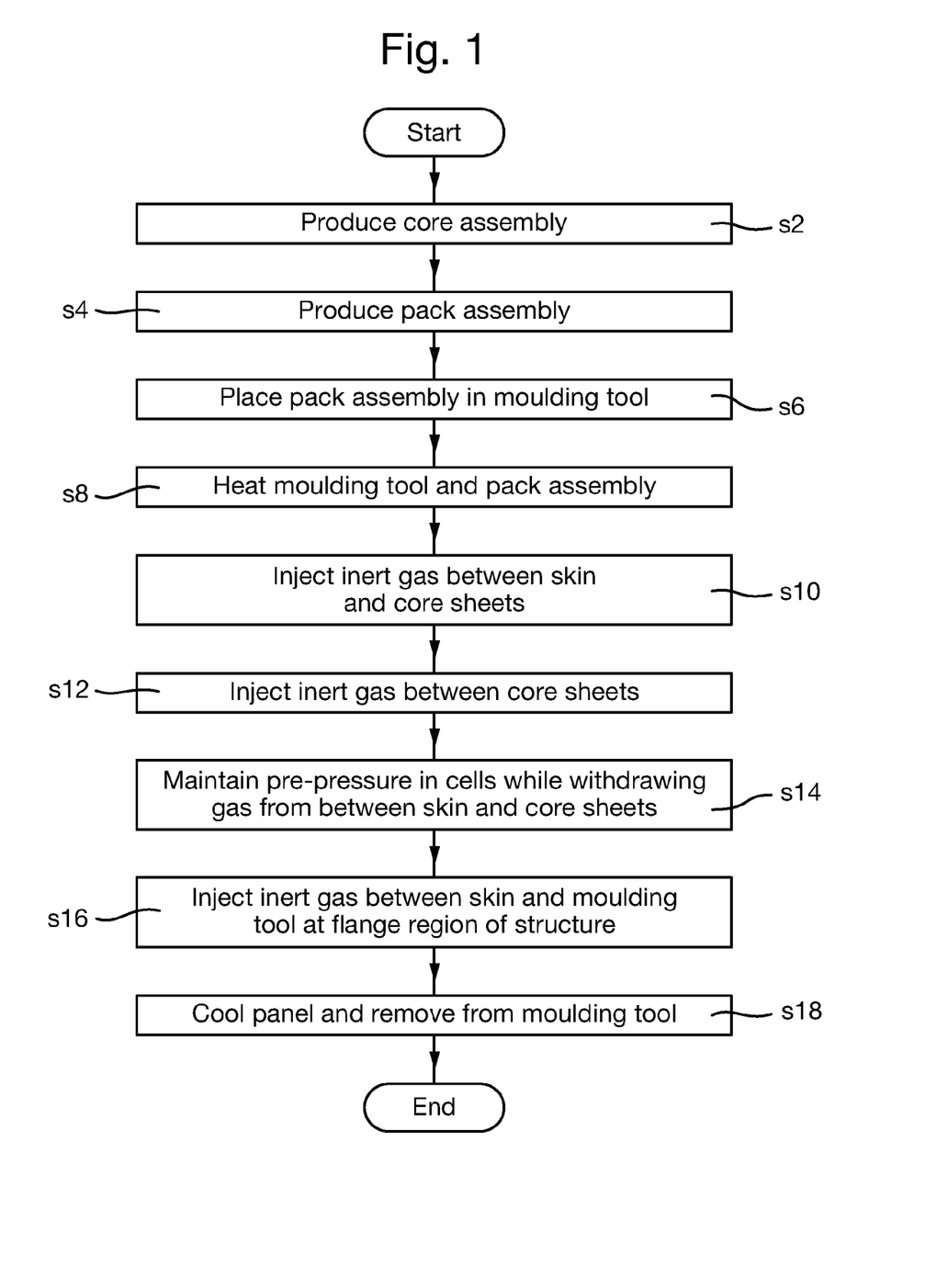
FIG. 1 is a process flow chart showing certain steps of a process of forming a structure.

FIG. 1 is a process flow chart showing certain steps of an embodiment of a process of forming a structure using SPF/DB techniques. In this embodiment, the structure being formed is a panel for use on an aircraft, however it will be appreciated by those skilled in the art that the described process may be used to form different types of structures.

It should be noted that certain of the process steps depicted in the flowchart of FIG. 1 and described below may be omitted or such process steps may be performed in differing order to that presented below and shown in FIG. 1. Furthermore, although all the process steps have, for convenience and ease of understanding, been depicted as discrete temporally-sequential steps, nevertheless some of the process steps may in fact be performed simultaneously or at least overlapping to some extent temporally.

At step s2, a core assembly is produced.

Figure 2:
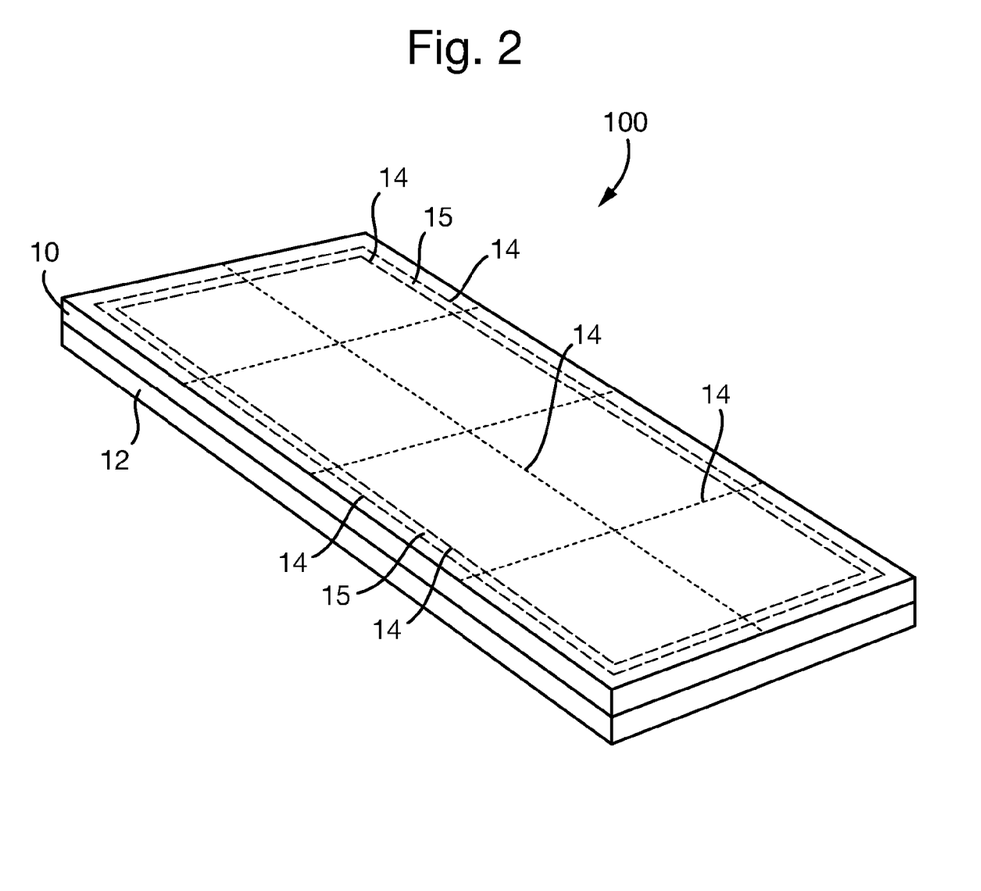
FIG. 2 is a schematic illustration (not to scale) showing a core assembly produced during the process of FIG. 1.

FIG. 2 is a schematic illustration (not to scale) showing the core assembly 100 produced at step s2. In this embodiment, the core assembly 100 is produced by applying stopping off material (for example, a yttria stop-off compound) between two core sheets 10, 12. The stopping off material forms a layer that prevents the core sheets 10, 12 being diffusion bonded together at operating temperatures in the areas to which the stopping off material has been applied. The core sheets 10, 12 are then joined together by line bonds 14. These line bonds 14 can be formed by diffusion bonding the two core sheets 10, 12 together, in which case the stopping off material should be omitted in the region of the line bonds 14. Alternatively, the core sheets 10, 12 can be bonded together by other techniques, for example resistance welding or laser bonding.

Figure 6:
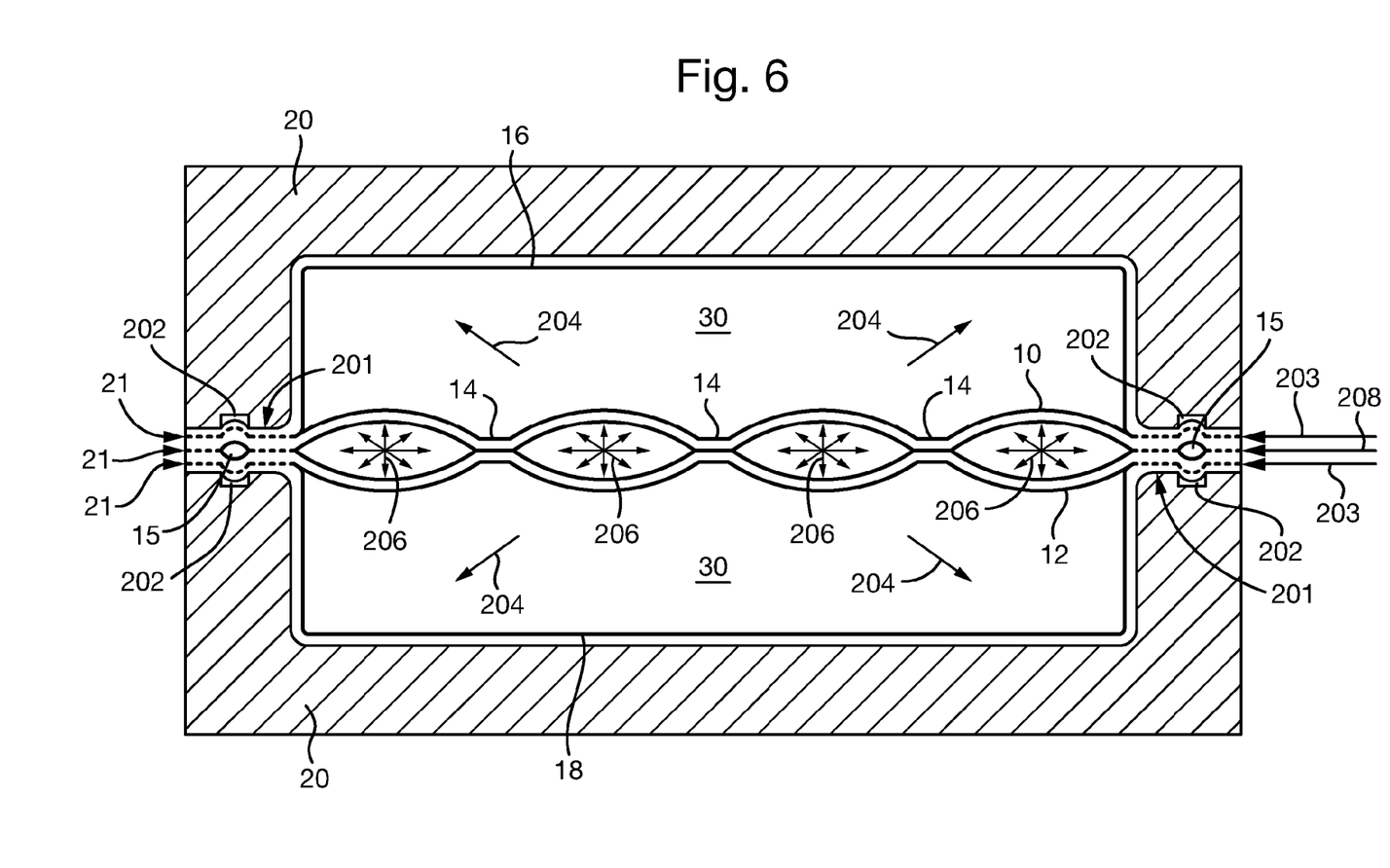
FIG. 6 is a schematic illustration (not to scale) showing the pack assembly within a moulding tool.

The line bonds 14 define a plurality of cells which are to be inflated at a later stage, as described in more detail later below with reference to steps s12 and s14, and FIGS. 6 and 8. Also, in this embodiment, the line bonds 14 define a channel 15 (i.e. a so-called "raceway") proximate to, but spaced apart from, the side edges of the core assembly 100. The channel 15 surrounds a central portion of the core assembly 100. The channel 15 may run approximately parallel to the side edges of the core assembly 100, while also being spaced apart from those side edges. The channel 15 is to be inflated at a later stage, as described in more detail later below with reference to steps s12 and s14, and FIG. 7.

At step s4, a pack assembly (i.e. a pack) is produced.

Figure 3:
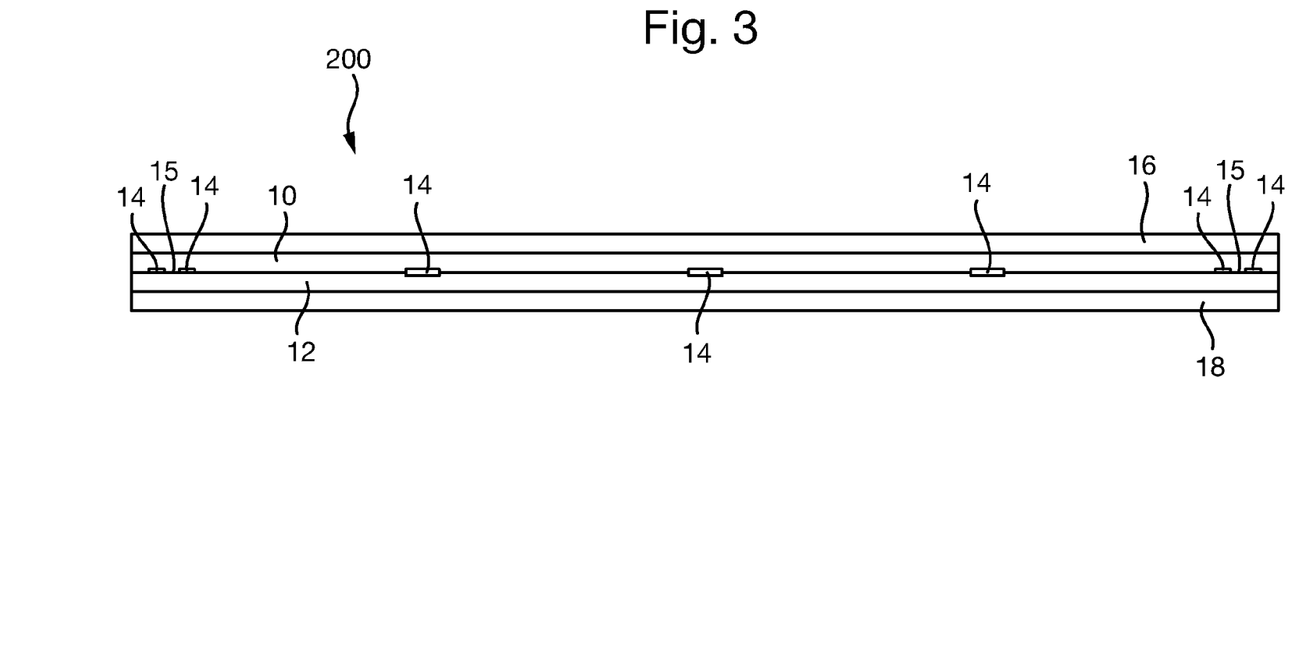
FIG. 3 is a schematic illustration (not to scale) showing a pack assembly (a pack) produced from the core assembly.

FIG. 3 is a schematic illustration (not to scale) showing the pack assembly 200 produced at step s4. In this embodiment, the pack assembly 200 is formed by sandwiching the core assembly 100 (i.e. the bonded together core sheets 10, 12) between skin sheets 16, 18. The pack assembly 200 shall be sealed around its outer perimeter by a weld or a bond (not shown). Ducts are included in the pack assembly 200 allowing gas to be injected into the region between the core sheets 10, 12 and independently in regions between the skin sheets 16, 18 and their adjacent core sheets, 10, 12. Gaps may be left in the line bonds 14 to allow the passage of gas between adjacent regions of the core sheets.

The core and skin sheets may be titanium alloy sheets, for example titanium/aluminium/vanadium alloy, e.g. alpha-beta titanium alloys such as Ti-6Al-4V. However, the one or more of the core and skin sheets may be a different material capable of being superplastically formed and diffusion bonded, for example a metal selected from the group consisting of nickel, cobalt, titanium, iron, aluminium and alloys thereof and combinations thereof. For example, a steel (ultra-fine grained steel), a superalloy (for example a nickel or cobalt superalloy) or a titanium alloy. Particularly preferred alloys are Ti-6Al-4V or SP-700 (Ti-4.5Al-3V-2Mo-2Fe).

In this embodiment, the surfaces of the skin sheets 16, 18 that are adjacent to the core sheets, 10, 12 comprise venting grooves formed therein.

Figure 4:
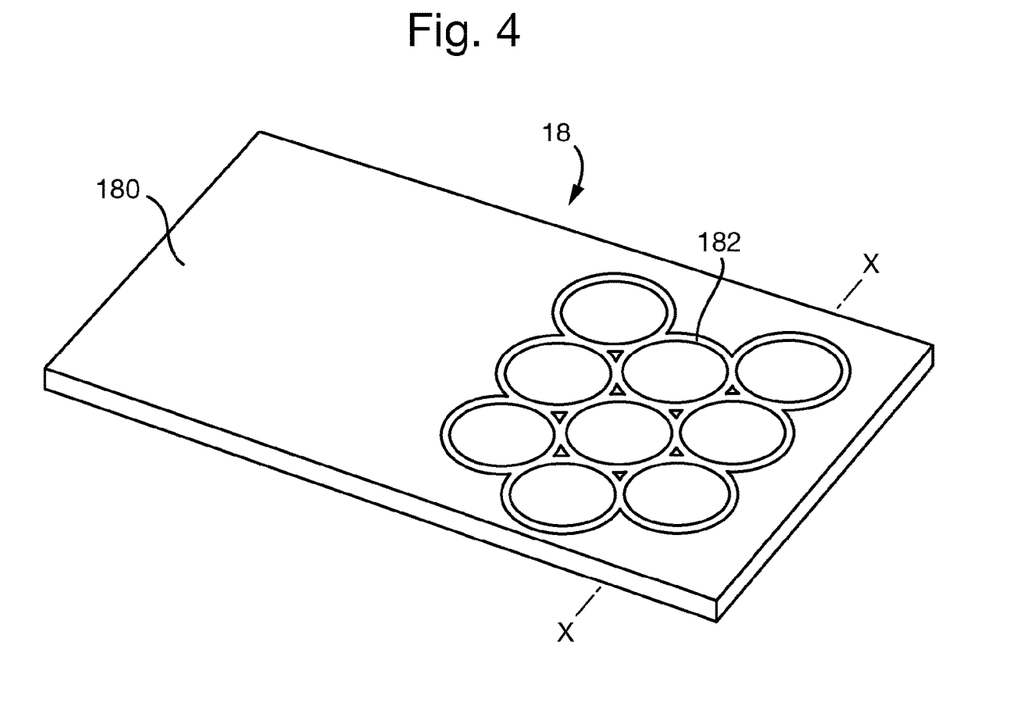
FIG. 4 is a schematic illustration (not to scale) showing a perspective view of a skin sheet of the pack assembly.
Figure 5:
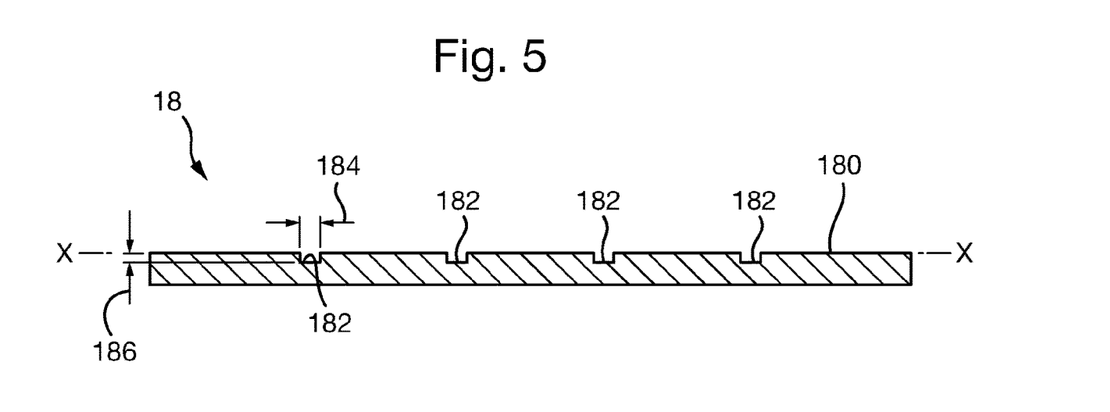
FIG. 5 is a schematic illustration (not to scale) showing a cross section through the skin sheet.

FIG. 4 is a schematic illustration (not to scale) showing a perspective view of the skin sheet 18. FIG. 5 is a schematic illustration (not to scale) showing a cross section through the skin sheet 18 shown in FIG. 4, along the line indicated X-X in FIG. 4.

A surface 180 of the skin sheet 18 that is adjacent to (e.g. abutting) the core sheet 12 in the pack assembly 200 (and will later be diffusion bonded to that core sheet 12) comprises venting grooves 182 formed therein. The venting grooves 182 are grooves or depressions in the surface 180 of the skin sheet 18. The venting grooves 182 may be formed by machining, e.g. using a computer numerical control (CNC) router, the surface 180 of the skin sheet 18.

The venting grooves 182 take the form of a plurality of interlocking or intersecting loops (or loop-shaped grooves). Thus, when viewed from above, the plurality of loops of the venting grooves 182 overlap or intersect each other. The loops of the venting grooves 182 may be substantially circular or elliptical loops, but alternatively the venting grooves may have different shapes for example polygonal-loops, or non-loops.

The loops, or loop-shaped grooves, of the venting grooves 182 may have any appropriate diameters. The diameters may be from about 0.1 cm to 20 cm. Examples of appropriate diameters for the loops include, but are not limited to about 0.1 cm-5 cm, 5 cm-10 cm, 10 cm-15 cm, or 15 cm-20 cm. The widths of the venting grooves 182 (an example of which is indicated in FIG. 5 by arrows and the reference numeral 184) may be any appropriate widths. The widths may be from about 1 mm to 10 mm. Examples of appropriate widths for the venting grooves 182 include, but are not limited to about 1 mm, 2 mm, 3 mm, 4 mm, 5 mm, or more than 5 mm. The depths of the venting grooves 182 (an example of which is indicated in FIG. 5 by arrows and the reference numeral 186) may be any appropriate depth. The depths may be from about 0.5 mm to 1.0 mm. Examples of appropriate depths for the venting grooves 182 include, but are not limited to about 0.5 mm, 0.6 mm, 0.7 mm, 0.8 mm, 0.9 mm, 1.0 mm, or more than 1 mm.

The venting grooves 182 define multiple interlocking recessed pathways across the surface 180 of the skin sheet 18. The pathways defined by the venting grooves 182 may be meandering, i.e. non-straight (preferably curved), recessed pathways. Nevertheless, in some embodiments, the venting grooves 182 or a portion thereof may define a straight recessed pathway across the surface 180 of the skin sheet 18.

The venting grooves 182 are illustrated in FIGS. 4 and 5 as comprising nine interlocking loops (or loop-shaped grooves), for reasons of clarity and ease of depiction only. It will be appreciated by those skilled in the art that, in practice, the venting grooves 182 may comprise a different number (e.g. more or less than nine) interlocking loops (or loop-shaped grooves).

The venting grooves 182 are illustrated in FIGS. 4 and 5 as being formed in only part, not all, of the surface 180 of the skin sheet 18. However, it will be appreciated by those skilled in the art that, in practice, the venting grooves 182 may be formed in a different part of the surface 180 of the skin sheet 18 to that shown in FIGS. 4 and 5, or indeed across substantially all of the surface 180. Preferably, the venting grooves 182 are located on the surface 180 at least at a position that is at and/or proximate to the peripheral edge portion of that surface 180. For example, preferably the venting grooves 182 are located at and proximate to a portion of the surface 180 that will become the flange of the panel during the later steps (s6-s18) of the process of FIG. 2.

Although only venting grooves 182 in the skin sheet 18 are described above (with reference to FIGS. 4 and 5), it will be appreciated by those skilled in the art that the other skin sheet 16 may also comprise venting grooves in its surface that is adjacent to (e.g. abutting) the core sheet 10 in the pack assembly 200 (and will later be diffusion bonded to that core sheet 10). Also, venting grooves may be formed in a surface of one or both of the core sheets 10, 12 that is adjacent to (e.g. abutting) a skin sheet 16, 18 in the pack assembly 200.

Steps s6 to s18 of the process shown in FIG. 2 will now be described with reference to FIG. 6. FIG. 6 is a schematic illustration (not to scale) showing the pack assembly 200 (i.e. the core sheets 10, 12 and skin sheets 16, 18) within a moulding tool 20.

At step s6, the pack assembly 200 is placed between two halves of the moulding tool 20 that can be heated. The two halves of the moulding tool 20 are pressed together to hold the pack assembly 200 within the internal cavity of the moulding tool 200. In some embodiments, these edges of the pack assembly are hereinafter referred to as a "flange portion" of the panel, and are indicated in FIG. 6 by the reference numeral 201. The clamping forces, when subsequently supplemented by heating, can provide for the development of diffusion bonds 21 at the flange portion 201 if so desired.

Ducts are included in the pack assembly 200 and/or the mould tool 20 allowing gas to be injected into regions between the skin sheets 16, 18 and the mould tool 20, at least in the flange portion 201, as described in more detail later below with reference to step s16.

In this embodiment, the moulding tool 20 comprises recessed grooves 202 that, when the pack assembly 200 is placed in the moulding tool 20, engages with the flange portion 201 of the pack assembly, at a position approximately opposite the channel 15. However, in other embodiments, these recessed grooves 202 may be omitted.

At step s8, the moulding tool 20 with the pack assembly 200 therein is heated to a temperature at which superplastic forming takes place. The term superplasticity used herein takes its usual meaning in the art, that of the ability of a polycrystalline material to exhibit, in a generally isotropic manner, very high tensile elongation prior to failure. Whether superplastic flow has been induced in a material can be measured by any known method in the art, such as the Active Standard ASTM E2448 (standard test method for determining the superplastic properties of metallic sheet materials). The temperatures required to induce superplasticity in a particular material are also known in the art. For example in the case of an titanium alloy such as Ti-6% Al-4% V, the required temperature is typically in excess of 850° C. (e.g. about 870° C., about 880° C., about 890° C., about 900° C., about 910° C., about 920° C., or about 930° C.). For an aluminium alloy such as AA5083, the temperature required to induce superplasticity may be as low as about 450-520° C.

At step s10, an inert gas is injected between each skin sheet 16, 18 and its adjacent core sheet 10, 12 respectively. Thus, inert gas is injected into the cavities 30 between the skin and core sheets. This inert gas may be injected into the cavities 30 between the skin and core sheets via a so-called "skin gas line" 203. This injection of gas into the cavities 30 causes the skin sheets 16, 18 to be urged against the internal face of the moulding tool 20, as indicated in FIG. 4 by arrows and the reference numerals 204. The skin sheets 16, 18 thereby adopt the shape of the internal face of the moulding tool 20.

At superplastic forming temperatures, titanium alloys can form a surface layer (or "case"), which is an alpha phase formed particularly in the presence of alpha phase stabilising elements, such as oxygen and nitrogen. The formation of an alpha case in a location that is to be diffusion bonded drastically reduces the strength of the diffusion bond and in addition has a detrimental effect on fatigue performance. For this reason, the gas used in superplastic forming is preferably substantially free of such alpha case stabilising elements and so a high purity gas with a very low content of alpha case stabilising elements (in excess of 99.99% purity) is preferably used. The gas may also be passed over or through a reactive "getter" (e.g. a hot section of clean titanium) which tends to achieve desirable low (trace) levels of residual oxygen and/or nitrogen in the gas. An example of an inert gas that may be used in the SPF/DB process is argon, which is inert and relatively cheap, however other inert gases may be used, such as helium, neon, krypton, and xenon.

Once the skin sheets 16, 18 have been urged away from the core sheets 10, 12, e.g. once they have been partially or fully formed into shape by the moulding tool 20, at step s12 inert gas is injected between the core sheets 10, 12 causing the areas between the bonds 14 to "inflate". This inflation indicated in FIG. 6 by arrows and the reference numerals 206. This inert gas may be injected between the core sheets 10, 12 via a so-called "core gas line" 208.

Figure 7:
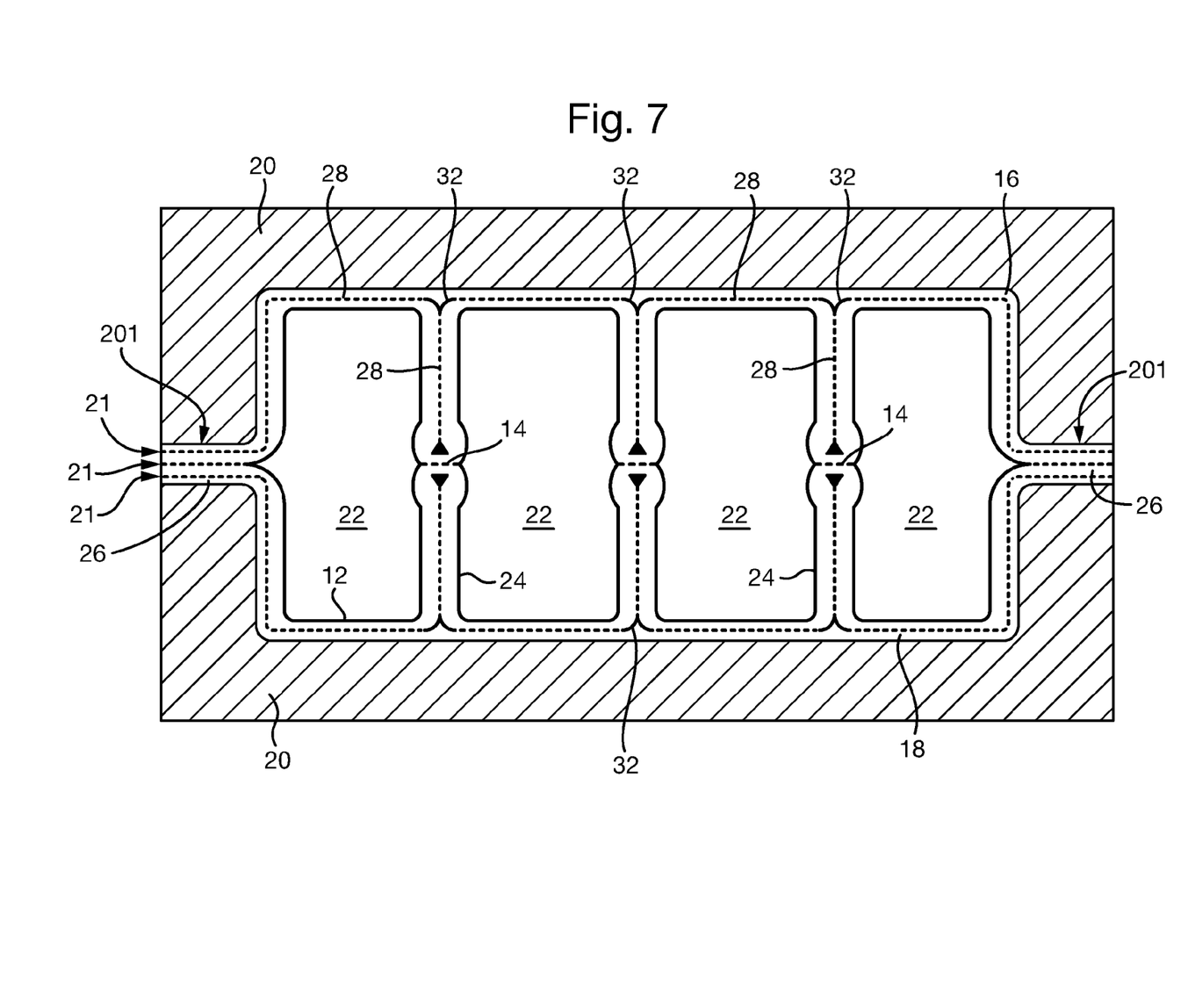
FIG. 7 is a schematic illustration (not to scale) showing inflation of core sheets of the pack assembly while in the moulding tool.
Figure 8:
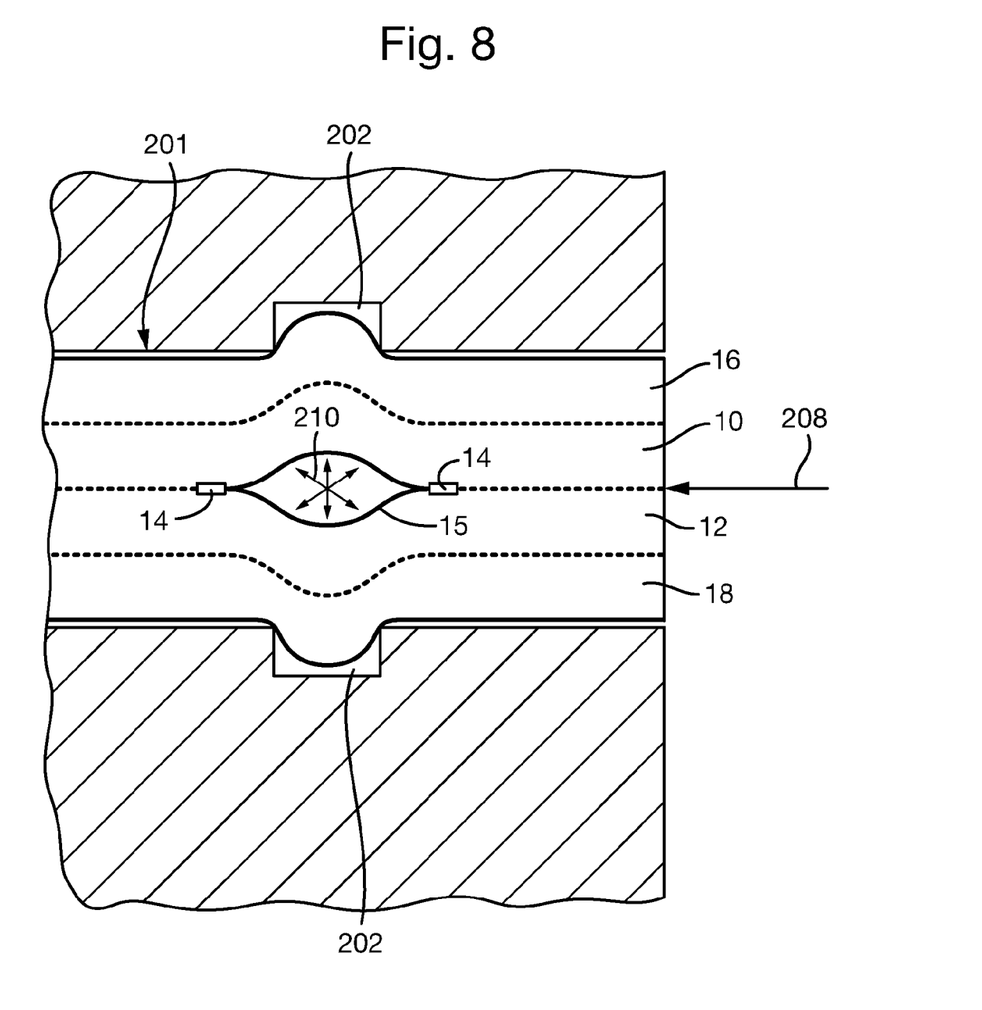
FIG. 8 is a schematic illustration (not to scale) showing further details of a flange portion of the pack assembly, and illustrating inflation of a channel therein.

As shown in FIG. 7 (which is a schematic illustration showing the inflated core sheets 10, 12), this inflation of the core sheets 10, 12 is continued until the core sheets 10, 12 form a series of cells 22 divided by walls 24. The upper half of each wall 24 is formed by a double-backed section of core sheet 10; likewise, the bottom half of each wall 24 is formed by a double-backed section of core sheet 12. The bonds between the two halves of the wall are the line bonds 14 formed in step s2. Inflation of the core structure (i.e. the core sheets 10, 12) thereby produce a cellular array.

The injection of the inert gas between the core sheets 10, 12 via the core gas line 208 also causes inflates the channel 15. FIG. 8 is a schematic illustration (not to scale) showing further details of the flange portion 201, and illustrating this inflation of the channel 15. The inflation of the channel 15 is indicated in FIG. 8 by arrows and the reference numeral 210.

In this embodiment, the inflation of the channel 15 causes the core sheets 10, 12 to move apart at the channel 15. This relative movement of the core sheets 10, 12 at the channel 15 urges the skin sheets 16, 18 against the surface of the mould tool 20 in the proximity of the channel 15. Preferably, the skin sheets 16, 18 are urged into the recessed grooves 202 in the moulding tool 20 as shown in FIG. 8. This urging or forcing of the skin sheets 16, 18 against the surface of the mould tool 20 in the proximity of the channel 15 (and preferably into the recessed grooves 202) tends to create a gas tight seal between the skin sheets 16, 18 and the mould tool 20, along the path of the channel 15.

During the inflation of the core sheets 10, 12, when the core sheets 10, 12 first contact the skin sheets 16, 18 (so-called "sticking contact"), there is a tendency for a compressive stress to be imparted by the expanding core sheets 10, 12 to the skin ahead of the advancing sticking contact point. This progressive stress can cause buckling of the skin layer, which is unsupported ahead of the advancing sticking contact point. The development of such buckling may eventually cause excess skin material to be drawn into the cell structure at the point of the cell boundaries (i.e. above the spandrels 32) and a line defect in the skin may occur above the spandrels 32. In order to attempt to minimise skin buckling, a back pressure of gas may be maintained in the cavity 30 between the core sheets 10, 12 and the skin sheets 16, 18 during inflation of the cores. The magnitude of this back pressure to avoid such buckling may depend on the relative thickness of the core and the skin sheets 10, 12, 16, 18 and the geometry of the cells 22. As described later below, this back pressure may be removed once the cores have been fully formed (or approaching being fully formed) in order to prevent excess gas being trapped between the core sheet 10, 12 and the skin sheet.

At step s14, the gas pressure within the cells 22 and heating are maintained for a predetermined time after the cells 22 have been inflated so as to form diffusion bonds 28 between the skin sheets 16, 18 and the adjacent areas of the core sheets 10, 12. Likewise, diffusion bonds 28 are formed between the double-backed sections of the core sheets 10,12 forming the walls 24 and between the outer edges 26 of the outer perimeter of the pack assembly 200 compressed by the two halves of the moulding tool 20.

The strength of the panel tends to be greatly enhanced by the presence of the diffusion bonds 28, and it is desirable that they should be formed at all interfaces between the core sheets 10, 12 and the skin sheets 16, 18. To that end, during step s14, the gas within the cavities 30 between the core sheets 10, 12 and the skin sheets 16, 18 is controlled. In particular, during step s14, gas is withdrawn from the cavities 30 as those cavities 30 shrink during inflation of the cells 22. For example, a vacuum pump may be connected to the skin gas line 203 and be used to withdraw gas from the cavities 30. This advantageously tends to prevent or oppose the gas being trapped between the core and skin sheets, which would prevent intimate contact between these sheets and so hinder diffusion bonding. Gas may be withdrawn from the cavities 30 in the region of the spandrels 32 formed at the top and bottom of the walls 24 between the core sheets and the skin sheets.

Advantageously, the venting grooves 182 formed in the internal surfaces 180 of the skin sheets 16, 18 tend to improve removal or withdrawal of the gas from the cavities 30 as those cavities 30 shrink during inflation of the cells 22. In particular, the venting grooves 182 provide a plurality of meandering channels along which gas may flow out of the cavities 30; these channels may remain open (allowing the gas to be removed from the cavities 30), even when the core sheets 10, 12 contact with and bond to the skin sheets 16, 18. The improved removal of the gas from the cavities 30 due to the venting grooves 182 advantageously tends to remove the likelihood of pockets of gas being trapped between the core and skin sheets. Thus, intimate contact between the core and skin sheets tends to be improved, which tends to lead to improved diffusion bonding between these sheets, especially in the regions bounded by the loops of the venting grooves 182.

At step s16, an inert gas is injected between the skin sheets 16, 18 and the moulding tool 20, preferably at or proximate to the flange portion 201. Preferably, this gas injection is performed after formation of the diffusion bonds 28 between the skin sheets 16, 18 and the adjacent areas of the core sheets 10, 12.

Figure 9:
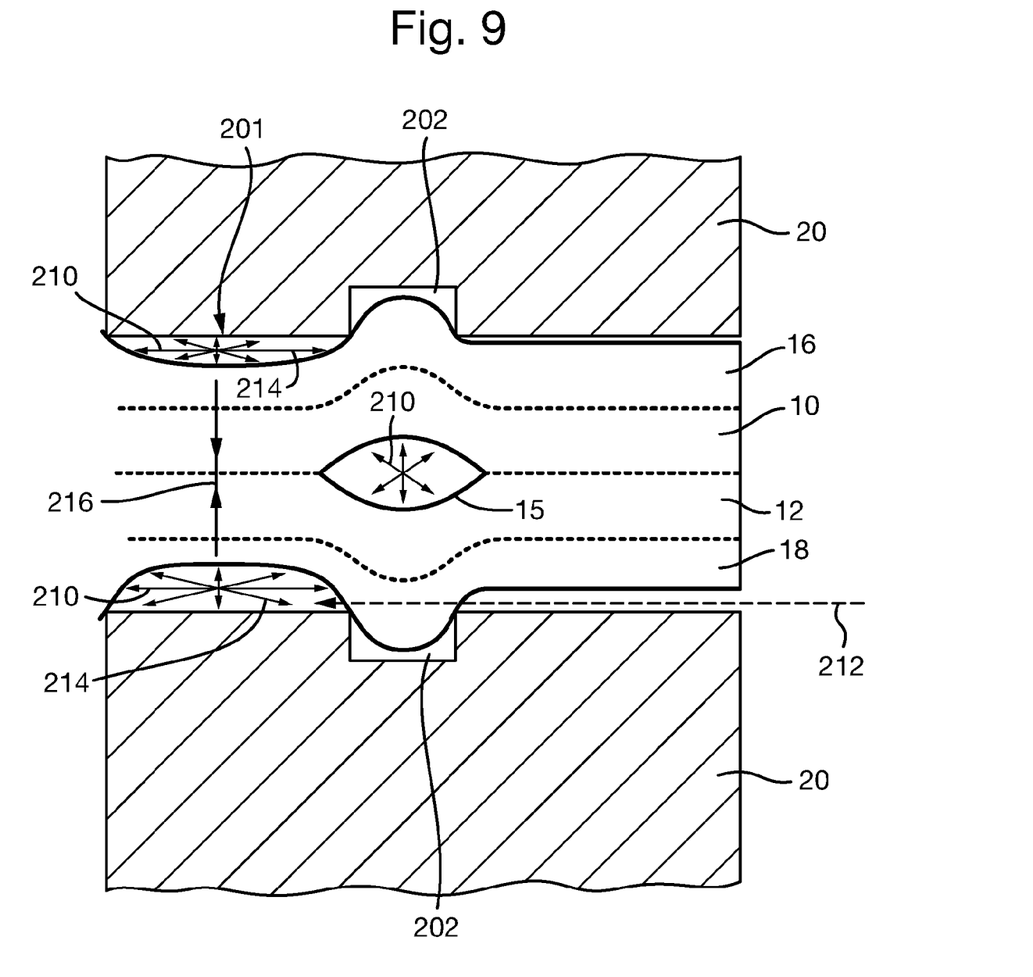
FIG. 9 is a schematic illustration (not to scale) illustrating an inert gas being injected between a skin sheet and the moulding tool.

FIG. 9 is a schematic illustration (not to scale) illustrating an inert gas being injected between the skin sheet 18 and the moulding tool 20 at the flange portion 201, as performed at step s16. This inert gas may be injected into the cavities 210 between the skin sheets 16, 18 via a so-called "tool gas line" 212. This injection of gas into the cavities 210 tends to cause expansion of these cavities 210, as indicated in FIG. 9 by arrows and the reference numeral 214. This expansion of the cavities 212 forces the skin sheets 16, 18 towards each other (against the core sheets 10, 12 sandwiched between the skin sheets 16, 18), as indicated in FIG. 9 by arrows and the reference numeral 216. This forcing together of the core and skin sheets 216 tends to improve intimate contact between the core and skin sheets 10, 12, 16, 18, which tends to provide improved diffusion bonding between these sheets 10, 12, 16, 18, at least in the flange portion 201. In some embodiments, inert gas is injected, via the tool gas line 212, into a cavity 210 at only one side of the flange portion 201, i.e. either between the upper skin sheet 16 and the moulding tool 20 or between the lower skin sheet 18 and the moulding tool 20. It may be the case that a groove recess 202 is only present at in the moulding tool 20 at which the inert gas is injected. For example, if inert gas is injected via the tool gas line 212 only between the upper skin sheet 16 and the moulding tool 20 and not between the lower skin sheet 18 and the moulding tool 20, then it may be the gas that there is a groove recess 202 only in the upper part of the moulding tool 20 (adjacent to the upper skin sheet 16), and not the lower part of the moulding tool 20.

Advantageously, gas tight seal between the skin sheets 16, 18 and the mould tool 20, along the path of the channel 15, created by inflation of the channel 15, tends to prevent or oppose gas from escaping from the cavities 210 between the skin sheets 16, 18 and the mould tool 20. This advantageously tends improve the forcing together of the core and skin sheets 216, which may lead to improved diffusion bonding between these sheets 10, 12, 16, 18.

Preferably, the gas injected between the skin sheets 16, 18 and the moulding tool 20 (i.e. the gas injected into the cavities 210 via the tool gas line 212) is at a lower pressure than the gas injected between the core sheets 10, 12 (i.e. the gas injected into the cells 22 and channel 15 via the core gas line 208). This advantageously tends to prevent or oppose the gas injected between the skin sheets 16, 18 and the moulding tool 20 from imploding the cellular structure of the panel. Also, this advantageously tends to restrict or limit the gas injected between the skin sheets 16, 18 and the moulding tool 20 to the flange portion 201. Also, this advantageously tends to prevent or oppose the gas injected between the skin sheets 16, 18 and the moulding tool 20 escaping from the cavities 210 past the gas tight seal created by inflation of the channel 15.

In some embodiments, at step s16, the inert gas is injected between the skin sheets 16, 18 and the moulding tool 20 only at one side of the pack assembly 200, e.g. between one half of the moulding tool 20 and one of the skin sheets 16 or 18, in the flange portion 201. This may cause the pack assembly to be forced against the other half of the mould tool 20, thereby to improve intimate contact between the core and skin sheets 10, 12, 16, 18, which tends to provide improved diffusion bonding between these sheets 10, 12, 16, 18, at least in the flange portion 201.

After formation of the diffusion bonds between the skin sheets 16, 18 and the adjacent areas of the core sheets 10, 12, at step s16 and s16 gas pressure may be removed (e.g. gradually), and the formed structure (i.e. the panel) is cooled and removed from the moulding tool 20. Thus, a process of forming a panel using SPF/DB techniques is provided.

Advantageously, the above described method and apparatus tends to reduce the likelihood of gas entrapment between the core and skin sheets 10, 12, 16, 18 of the panel. Such trapped gas would tend to reduce the strength of the diffusion bond between the core and skin sheets or indeed can prevent a diffusion bond being formed in those areas where gas is entrapped. Gas may be removed from the cavity 30 between the core and skin sheets via the spandrels 32 and the venting grooves 182, which tend to maintain a gas conduit for at least a time after the core cells 22 have been substantially formed.

As noted above the venting grooves are in the form of a plurality of interconnected loops. Advantageously, the regions within these loops tend to be substantially fully diffusion bonded by the above described process, i.e. having no or innocuous bond defects. These fully bonded regions bounded by the loops of the venting groove are particularly well suited as locations for mechanical fasteners due to the lack of inter-laminar no-bonds. Thus, improved mechanical and fatigue properties tend to arise. In some embodiments, the venting grooves are formed so that selected locations for mechanical fasteners are within regions bounded by the loops of the venting grooves.

Advantageously, the above described method and apparatus tends to provide for improved strength diffusion bonding between the sheets of the panel, at least in the flange portion.

The actual nature of the product made by superplastic forming is not relevant to the present invention so long as at least one skin sheet is used and at least one core sheet is used. In this context, a skin sheet is a sheet that is superplastically formed to the internal shape of a mould. A core sheet is a sheet that is superplastically formed after the skin sheet and so, while it is being superplastically formed, a cavity exists between the core sheet and its associated skin sheet. Subsequently, the core sheet and the skin sheet are diffusion bonded together. It is possible to have only one skin sheet in the structure; e.g. two core sheets could be provided, one of which is pressed against the skin sheet and diffusion bonded thereto and the other is pressed against the internal surface of the mould, thereby providing an outside surface in which the spandrels are visible.

A single core sheet can be provided with two skin sheets such that the core sheets zigzags between the two skin sheets; such an arrangement is well known.

Preferably, the structure has two core sheets and two skin sheets. However, a greater number of core sheets can be provided, if desired.

The techniques used for superplastic forming/diffusion bonding and in particular the gas management within the SPF/DB mould are all well-known and are directly applicable to the above described method and apparatus, with the modifications described above.

The invention claimed is:

1. A process of forming a structure by diffusion bonding and superplastic forming at least one skin sheet and at least one core sheet, the process comprising:
   a) forming a pack from the at least one skin sheet and the at least one core sheet, wherein the pack comprises a first surface of the core sheet positioned adjacent to a second surface of the skin sheet, and wherein one or more venting grooves are formed in at least one surface selected from the group of surfaces consisting of the first surface of the core sheet and the second surface of the skin sheet;
   b) placing the pack in a mould and heating the pack to a temperature at which the sheets are capable of superplastic deformation;
   c) injecting a first gas between the first surface of the core sheet and the second surface of the skin sheet to urge the skin sheet against an internal face of the mould thereby forming a cavity between the first surface of core sheet and the second surface of the skin sheet;
   d) injecting a second gas on the side of the core sheet remote from the skin sheet to urge the core sheet against the skin sheet;
   e) maintaining gas pressure of the second gas on the side of the core sheet remote from the skin sheet, thereby forming a diffusion bond between the skin sheet and the core sheet; and
   f) withdrawing some or all of the first gas from the cavity between the first surface of core sheet and the second surface of the skin sheet during at least part of step d).

2. The process according to claim 1, wherein the one or more venting grooves are formed in the second surface of the skin sheet and not in the first surface of the core sheet.

3. The process according to claim 1, wherein the one or more venting grooves define one or more meandering paths across the surface or surfaces in which the one or more venting grooves are formed.

4. The process according to claim 1, wherein the one or more venting grooves are formed by machining the surface or surfaces in which the one or more venting grooves are formed.

5. The process according to claim 1, wherein the one or more venting grooves define a plurality of interconnected loops.

6. The process according to claim 5, wherein the loops are circles or ellipses.

7. The process according to claim 5, wherein the process further comprises locating a mechanical fastener through the formed structure at a position that is within a loop defined by the venting grooves.

8. The process according to claim 1, wherein the one or more venting grooves are located in at least a flange portion of the structure.

9. The process according to claim 1, wherein the process further comprises injecting a third gas on the side of the skin sheet remote from the core sheet, between the skin sheet and the mould, thereby to force together the skin sheet and the core sheet.

10. The process according to claim 1, wherein the first gas is the same type of gas as the second gas.

11. The process according to claim 1, wherein the gases are noble gases.

12. The process according to claim 1, wherein at least two core sheets are used that have been joined together in selected areas and the second gas injected in step d) is injected between the at least two core sheets.

13. The process according to claim 1, wherein:
two skin sheets are used;
the pack in step a) is formed by sandwiching one or more core sheets between the skin sheets;
the first gas is injected in step c) between each skin sheet and its adjacent core sheet; and,
in step f), the first gas is withdrawn from the cavity between each skin sheet and its adjacent core sheet.

* * * * *